United States Patent [19]

Ertle et al.

[11] Patent Number: 5,424,012
[45] Date of Patent: Jun. 13, 1995

[54] METHOD FOR PURGING THERMOPLASTIC EXTRUDERS

[75] Inventors: Raymond T. Ertle; Raymond J. Ertle, both of Pompton Plains, N.J.

[73] Assignee: Cylatec Corp., Pompton Plains, N.J.

[21] Appl. No.: 179,978

[22] Filed: Jan. 11, 1994

[51] Int. Cl.⁶ .................... B29C 33/72; C11D 3/37; B08B 9/02
[52] U.S. Cl. ........................ 264/39; 134/7; 134/8; 134/22.13; 134/22.17; 252/174.23; 264/169; 264/349
[58] Field of Search .......... 264/39, 169, 349; 134/7, 8, 9, 22.11, 22.13, 22.17; 252/174.23, 174.15

[56] References Cited

U.S. PATENT DOCUMENTS

| | | | |
|---|---|---|---|
| 695,323 | 3/1902 | Mittinger, Jr. | 134/22.13 |
| 2,779,696 | 1/1957 | Rutherford, Jr. | 134/7 |
| 3,119,720 | 1/1964 | Stiles et al. | 134/8 |
| 5,139,694 | 8/1992 | Kmiec | 252/174.23 |
| 5,236,514 | 8/1993 | Leung et al. | |
| 5,246,654 | 9/1993 | Ertle et al. | |
| 5,298,078 | 3/1994 | Itoh et al. | 252/174.23 |

FOREIGN PATENT DOCUMENTS

| | | | |
|---|---|---|---|
| 60-36117 | 2/1985 | Japan | 264/39 |
| 62-117712 | 5/1987 | Japan . | |
| 62-176817 | 8/1987 | Japan . | |
| 5-269754 | 10/1993 | Japan . | |
| 539065 | 1/1977 | U.S.S.R. | 264/39 |
| WO8908017 | 9/1989 | WIPO . | |

Primary Examiner—Mathieu D. Vargot
Attorney, Agent, or Firm—Klauber & Jackson

[57] ABSTRACT

Methods and additives for purging thermoplastic extruders and associated apparatus are included which involve the addition of a purging additive to a follower thermoplastic resin which additive when heated causes the follower resin to froth as it passes through the unit, the passage of frothed resin thereby causing the removal of the contents of the unit, which contents includes resident resin along with resident additives, degraded materials and any other undesired materials which may be present in the unit.

14 Claims, No Drawings

METHOD FOR PURGING THERMOPLASTIC EXTRUDERS

BACKGROUND OF THE INVENTION

It is well known in the art to produce articles of commerce from thermoplastic materials by means of extrusion blown molding, extrusion injection molding, or simple extrusion of thermoplastic materials. These materials typically consist of low density polyethylene, high density polyethylene, polypropylene, polyvinyl chloride, acrylonitrile butadiene styrene copolymer, nylon, polycarbonate, polybutylene terephthalate, polyethylene terephthalate, polyphenylene sulfide, styrene-acrylonitrile, thermoplastic elastomers, as well as other polymers, copolymers and mixtures of these materials.

In actual practice, these thermoplastic polymers (TPs) must first be converted from a powdered, granular or pelletized form into a continuous stream of melted TP which then may be rolled into a desired shape, injected into a mold of the desired shade, or formed into a cylinder or parison which may be further expanded by air to conform to the inside surfaces of a blow molding mold cavity. The conversion of TPs into the required continuous melt stream is usually accomplished through the use of a heated barrel screw extruder.

The typical screw extruder basically consists of a barrel and screw, and also contains a feed section and a discharge port. The barrel consists of a long heavy-walled tube of steel which contains, as its inside surface, a hard wear-resistant alloy, and the bore of the tube is ground to very close tolerances. The complete construction of the barrel is such that it is capable of handling very high pressures, in the range of 1,000–10,000 psi, without distorting or rupturing.

The outside of the barrel is usually fitted with heating or cooling units along its length, and these units are configured in zones along the length of the barrel, such that various sections of the barrel may independently be heated or cooled as desired.

An opening at the feed end of the barrel serves as an introduction point for powdered, granular, or pelletized TPs into the screw, as well as for the introduction of coloring agents, fillers etc. which may be included as desired. To avoid premature melting of the TP feed, the area or zone around the feed section may be cooled by means of a cooling unit.

The barrel is fitted with a close fitting internal progressive screw with helical flights, and by rotating this screw in the proper direction, material is advanced in the barrel from the feed end toward the discharge end. The screw rotating in the barrel acts, in effect, like a pump. The screw design is such that material advancing through the barrel is subjected to ever increasing pressure as the cavity volume created between the screw and the barrel diminishes as viewed along the length of the assembly from the feed end to the discharge end. In actual practice, a typical screw may consist of three distinct sections: a feed section which serves to push material into the barrel; a compression section which exerts ever increasing pressure and a high amount of shear on the TP along its length; and a metering section which serves to complete the homogenization and melting of the TP and to force the material out of the assembly.

Actual melting of the TP is usually caused by both heat applied to the barrel by the heating units, as well as by the heat developed in the TP due to the mechanical action applied to it by the screw, since a certain amount of slippage or bypass of the melted TP occurs along the screw flights and between the screw and the barrel. This slippage and bypass also serves to homogenize the TP and any adjuncts, such as coloring agents, added to the feed section of the unit.

This slippage and bypass, although required for efficient TP processing, causes unwanted problems, however, when finished product colors and/or the type of TP material must be changed to meet production requirements. The constant back feeding and blending which occurs in the unit, with subsequent progressive dilution of the old color or feed stock with the new color or feed stock, necessitates the production of large amounts of undesirable or unusable material until the original color or TP is cleared completely from the unit, and only the second color or TP exits from the unit in its unadulterated state. Additionally, during normal production, degraded materials, such as carbonized resin particles, form in the apparatus and periodically appear in finished parts, and these materials must also be cleaned from the equipment.

In an effort to speed up this cleaning or change over process, compounds known as purging compounds (PCs) are employed. There are two basic types of PCs, physical and chemical.

Physical PCs (PPCs) are merely thermoplastics, occasionally containing abrasive materials such as diatomaceous earth, which may have a higher melt point than that of the material being purged from the equipment. Thus they operate by attempting to physically push the old material out of the equipment. In most cases they are marginally effective at best, and, if abrasive, can cause premature wearing of the screw, barrel and associated equipment if used on a regular basis. A PPC can also consist simply of a clear or neutral thermoplastic which only acts as an indicator to tell the operator when the original color has been purged from the equipment. In any case, large amounts of material must be run through the equipment, since the constant mixing and blending action of the screw tends to successively dilute the original color with the PPC rather than just push it through and out of the equipment. In actual practice, the new color is sometimes simply charged to the screw, and the process is run with the new color until all traces of the old color have disappeared. This may take up to several hours, and may result in hundreds of pounds of scrap. In extreme cases, the old color still occasionally appears in manufactured parts several days after changeover.

In any event, PPCs do not usually remove material from dead spots in the system, such as occur in valves and dies, and degraded materials such as carbonized particles of polymer usually remain in the equipment to exit at a later time resulting in manufactured parts which do not meet specifications.

Another type of purging compound, the chemical purging compound (CPC), attacks the problem in most cases by attempting to break down plastic residues in the equipment. These compounds typically contain thermoplastic resins, organic and inorganic salts, and inert materials. Typically their use may require that the feed to the screw be cut off, and the equipment then run until material ceases to exit from the discharge end. A quantity of neutral color thermoplastic is then charged to the screw and allowed to run out in the same manner. The system is then filled with CPC, and as soon as it begins to exit, the screw rotation is stopped, and with heat continually applied to the barrel, the compound is left in the equipment for a period of time, usually 15 minutes or more, to complete the reaction. In some cases, the temperature of the barrel heating units is increased, causing the barrel temperature to rise. After the reaction is deemed to be complete, the barrel temperature is lowered to its original state and the screw is restarted, causing the CPC to exit. The new desired color is then introduced into the screw feed and the remainder of the CPC is purged by means of the new color.

It is not unheard of for a chemical purge to take in excess of two hours to complete, from start to finish, especially if the barrel temperature is to be raised and then lowered. Many CPCs also tend to emit organic vapors and gasses as they work, and from an ecological and safety standpoint, leave much to be desired.

Another type of PC, the liquid PC, is also occasionally employed. These liquids may be aqueous in nature, and although usually inexpensive, are prone to slippage, wherein the friction between entire thermoplastic mass and the screw and barrel is reduced to the point where the assembly no longer acts like a pump, and the mass ceases to be forced under high pressure through the unit. Additionally, the aqueous component of these liquid PCs does not combine with the resins in an efficient and homogeneous manner within the apparatus.

As a testament to the ineffectiveness of the PCs currently available, one accepted and standard practice employed in color or material changeovers is the complete disassembly of the equipment followed by manual cleaning and subsequent reassembly. This process is both time consuming and labor intensive, and can result in equipment down time in excess of 16 hours. And yet, as costly as this procedure may seem, many processors currently consider this cleaning method to be the best available option, in light of the ineffectiveness of presently available purging compounds.

It is believed that this ineffectiveness of currently available PCs is due to the fact that the forward or leading surfaces of the screw flights are, during operation, subjected to high material drag forces which tend to allow the PCs to scrub these surfaces free of old color and material. The trailing surfaces of the screw flights, however, are not subjected to drag forces as high as those which occur on the leading surfaces, and it is this thermoplastic material and carbonized and other degraded material attached to these trailing surfaces that currently available PCs fail to remove effectively. Dead spots in the equipment, as in valve and die assemblies, wherein the velocity of molten thermoplastic materials under normal operation is lower than the velocity found in most parts of the system, also tend to cause a problem for currently available PCs, in that material in these dead spots tends to remain in place during purging.

Some commercially available purging products attempt to overcome this problem by requiring that the apparatus be filled with purging compound, the temperature of the apparatus be raised significantly, and the purging compound be allowed to remain in contact with the internal surfaces of the apparatus for an extended time period, e.g. 10 to 30 minutes. The temperature of the apparatus must then be lowered to the original processing temperature. Thus the time required to raise and lower the apparatus temperature, as well as the contact time required, can be significant and highly undesirable in a production environment, especially if a second purge is required.

A number of purging compounds are currently being sold commercially, and references may be cited pertaining to extruder purging compounds. In published Japanese patent application JP5269754, a purging compound is described which consists of a thermoplastic resin having particular melt flow characteristics. U.S. Pat. No. 5,236,514 describes a purging composition containing both a matrix and a carrier resin of specific compositions along with a phosphate ester or metal salt of a carboxylic acid and an abrasive such as diatomaceous earth. In published international application WO 8908017, a compound for purging is disclosed which contains at least two different kinds of hard particulate material having different average particle radii along with a specific thermoplastic resin composition and a surfactant, and in which the harder particulate materials act as abrasives. In published Japanese applications JP62176817 and JP62117712, purging compositions are described which consist of an aromatic polyester resin having a higher melt viscosity than the thermoplastic resin being purged, and also contain water or a compound containing water of crystallization. In all of the above cases, as well as in the case of currently available purging compounds, attempts are made to scrape the material from the apparatus, remove it with a higher viscosity thermoplastic material, or chemically lower the viscosity of, or break down the resin being purged. These purging methods and compounds are not effective in addressing the root of the purging problem, that is, removal of resin from the lower pressure areas of the screw, i.e. the trailing edges of screw flights, and dead, or low velocity areas, in the equipment, and they require long periods of time to accomplish their stated purposes.

OBJECTS OF THE INVENTION

In accordance with the foregoing, it may be regarded as an object of the present invention to provide methods and compositions incorporating particulate additives for purging thermoplastic extruders and associated equipment such as valves, ports and dies which will effectively cause a previous color or thermoplastic material to be removed from the extruder and associated equipment.

It is a further object of the invention to provide purging methods and compositions incorporating particulate additives which will also cause the removal from the extruder and associated equipment of degraded materials such as carbonized particles of thermoplastic materials and additives.

It is still a further object of the invention to provide such purging methods and compositions incorporating particulate additives which will perform the aforesaid functions quickly, without the need for a soaking or reaction period.

It is yet a further object of the invention to provide purging methods and compositions incorporating particulate additives which do not develop any objectionable vapors or gasses during use, are safe and ecologically sound, and do not result in the production of large amounts of scrap or unusable material.

BRIEF SUMMARY OF THE INVENTION

In the purging of a thermoplastic extruder, the objective most commonly sought is to expel a primary or first thermoplastic resident composition which includes a primary or first thermoplastic resin together with possible colorants and degraded materials. These contents of the extruder or its associated equipment are to be replaced with a thermoplastic secondary or follower composition which includes a thermoplastic secondary resin and optional colorants, while at the same time also removing from the apparatus any other undesirable degraded materials such as carbonized particles of resin. Pursuant to the present invention purging is carried out by passing through the unit a thermoplastic follower composition which includes a thermoplastic resin in combination with a particulate purging additive which releases gases or vapors when subjected to the temperatures within the unit. This additive acts to froth and increase the effective volume of the follower composition and this resultant frothed follower composition causes removal of the contents of the unit as it passes through it. In an exemplary mode of practicing the invention, the feed of primary thermoplastic composition to the extruder is cut off and the extruder is allowed to eject the primary thermoplastic composition until the flow stops. The resin component of a thermoplastic secondary or follower composition is then fed to the extruder, and when a significant flow of such resin is achieved at the discharge of the apparatus, a particulate additive which functions to release gases or vapors when heated is introduced into the extruder and combines with the resin of the follower composition. The additive causes the resin to froth and to increase in volume within the apparatus. Internal pressure within the apparatus may be increased still further by optionally throttling down the discharge port of the unit during the purging operation. The frothed thermoplastic follower composition exiting the apparatus carries with it the primary thermoplastic composition including the first or primary resin, along with possible colorants, particles of carbonized resin and other undesirable particles still contained within the apparatus. As additional thermoplastic follower composition is fed to the extruder, remaining frothed resin is discharged from the apparatus, and a pure stream of the secondary thermoplastic composition results. Thus a thermoplastic extruder may be purged in an extremely quick and effective manner without employing abrasives, and without causing any toxic vapors or gasses to be given off, while removing undesired material from low pressure or low velocity areas of the equipment.

The resin of the follower composition will most commonly be the same as the primary or initially resident resin. It is also possible for the resin of the follower composition to comprise a composition different from the primary resin, although this is usually not necessary in the practice of the invention. The colorants (when present) in the follower composition, can be the same as or different from possible colorants in the first thermoplastic composition.

In instances where purging is required due to a buildup of degraded materials such as carbonized resin or other undesirable contaminants in the equipment, but a change in resin type or color is not desired, a maintenance purge may be accomplished by simply feeding the additive into the resin stream. In such instances it will be clear that the resin of the follower composition is the primary resin.

Additives which, when subjected to heat, cause the resin to froth and increase in volume will serve the purpose of my invention. For example, effective additives to accomplish the desired frothing consist of hydrated silicates which expand or intumesce upon heating, and particularly effective additives are materials such as are described in my U.S. Pat. No. 5,246,654 and my copending U.S. application Ser. No. 08/123,432, incorporated herein by reference, and consist of a free-flowing alkali metal silicate-based particulate material in which said silicate is the majority non-aqueous component and is present as an amorphous phase; the particles of said particulate having a moisture content of about 5 to 40%, and being expandable to at least about 5 times their initial volume upon heating at a temperature in the range of about 250° F. to about 1100° F.

While not wishing to be held to any particular theory, it appears that the rapid expansion of the additive along with subsequent frothing of the thermoplastic resins in the apparatus causes additional pressure and shearing forces on the normally lower shear areas of the screw, i.e. the trailing edges of the screw flights, and increases the velocity of material flow in normally dead or low velocity areas, thereby effectively purging the apparatus. It is also believed that the frothed resin has a lower density and viscosity than the melted resin alone thus serving to allow the frothed resin along with any contaminants to be easily and fully discharged by the secondary resin as it passes through the apparatus.

DETAILED DESCRIPTION

To insure the effective purging of a primary resin and other undesirable degraded materials such as carbonized resin particles, two main parameters are to be considered in determining the amount of additive required to accomplish said purging, namely, the length of time the equipment has been in operation since the last cleaning or purging was performed and the effective volume of the extruder and its associated equipment such as dies, valves, etc.

Addressing the first parameter, in instances where several resin and/or color changes have been made by simply supplementing a secondary resin feed for a primary resin feed and allowing the secondary resin to purge the primary resin, i.e. by simply continually feeding the secondary resin to the apparatus until the melt stream is considered pure enough for manufacturing purposes, it is not unusual to find layers of the various primary resins previously used upon various surfaces within the apparatus upon disassembly. For a purge to be considered effective, these layers must be removed, since they can, and often do, become detached from said surfaces in a random fashion during normal production, thereby causing the production of finished parts which do not meet specifications. The build up of degraded materials such as carbonized resin particles and additives in the equipment is also a function of the length of time of operation between cleanings, as well as the number of times the equipment has been allowed to cool down during non-production periods and reheated to resume production, and the amount of time the equipment is allowed to sit idle with heat applied to the barrel.

The effective volume of the extruder normally consists of the volume of the barrel bore less the physical volume of the screw, and will determine the amount of resin the barrel is capable of containing during normal operation. Also to be considered is the volume of the associated equipment such as valves, dies and chambers.

The degree of frothing and expansion of the resin will be determined by the number of parts of additive combining with 100 parts of resin to produce the frothing.

The amount of frothed resin required to effectively purge the extruder is directly related to the condition of the extruder, that is, the amount of contaminant contained in the equipment, and to the aforesaid volume of the extruder.

Thus the total amount of additive required for an effective purge will be variable depending upon the equipment void volume and the condition of the equipment being purged.

In actual practice, the minimum amount of the additive to be combined with a given amount of resin will be that amount necessary to produce a visible frothing of the extrudate as it exits the equipment. To produce adequate frothing and expansion of the resin, a minimum of about 0.1 parts of additive to 100 parts of resin is required. In actual practice, the preferred minimum ratio of additive to resin is 0.3 parts additive to 100 parts resin.

The amount of frothed resin required for an effective purge can be defined as a percentage of the total void volume of the extruder, with about 10% of the total volume usually being the minimum required. Thus an extruder with an internal volume of one cubic foot will require a minimum of about 0.10 cubic foot of frothed resin to accomplish an effective purge. In actual practice, the minimum preferred percentage of frothed resin will be about 25% of the extruder void volume. In extreme cases where large amounts of difficult to remove primary resins and carbonized particles are encountered, it may be advisable to run several smaller volume purges through the equipment rather than one large volume purge.

EXAMPLE I

A purging additive was prepared by combining 2500 parts of alkali metal silicate solution with 50 parts of hydrous magnesium silicate and 100 parts of 20% boric acid solution. The mixture was heated and water was allowed to evaporate until enough water was driven off to yield a moisture level in the mixture of 54%. The mixture was subsequently comminuted and further dried such that the comminuted particles had an average moisture content of 22%. These dried particles were subsequently comminuted to yield a particulate, the particles of which all passed through a 20 mesh U.S. standard screen. This additive was then employed in the purging of a commercial injection molding extruder.

To the feed stream of a 2 inch injection molding extruder which had been processing white polypropylene resin at a temperature of 375° F. for at least several hours was added 27 grams of the above described additive. The additive was added to the extruder feed in such a manner that it combined with approximately 900 g of white polypropylene resin as it was fed into the apparatus. The purging compound thus formed in the extruder was subsequently injected into an injection mold and the first parts thus produced were carefully inspected, and found to contain large amounts of colored resin which were not present in the feed and thus could only have come from within the apparatus itself. This occurred in spite of the fact that large amounts of white resin were passed through the equipment before the purging operation and this white resin did not remove these colored resins remaining in the apparatus from previous manufacturing runs.

EXAMPLE II

A 2 inch injection molding extruder running black polypropylene resin was purged using a commercially available chemical purging compound wherein the mold was parted from the extruder, black resin feed was cut off, and the extruder was allowed to run until the majority of the black resin was cleared. White polypropylene resin was then fed into the extruder and the extruder was run until the melt stream appeared white in color. The purging compound was then introduced into the extruder and the screw rotation was halted. The barrel temperature was raised approximately 100° F. from 380° F. to 480° F. and the purging compound was allowed to react in the apparatus for approximately 15 minutes, at which time the barrel temperature was lowered to its original state and the screw was restarted, whereupon the purging compound was allowed to be discharged from the extruder and white resin was continually added to the extruder feed. The extruder was run for an additional 10 minutes to insure an uncontaminated white extrudate, at which time the unit was again purged employing the teachings of the present invention.

A quantity of the additive described in EXAMPLE I was added to the white resin feed such that the 45 grams of additive were combined with approximately 454 grams of white resin and this purge was allowed to pass through the extruder. The frothed resin extrudate was carefully examined and was found to contain significant quantities of black resin which had been purged from the unit. This was both a significant and surprising occurrence, since the unit had already been purged with a commercially available purging compound, and attests to the high efficiency and efficacy of the methods and compounds of the present invention.

EXAMPLE III

The feed of an extruder running low density polyethylene resin pigmented with carbon black was switched to unpigmented resin of the same composition and allowed to run with this new feed until the extrudate was deemed to consist of unpigmented resin. A quantity of the additive of EXAMPLE II was introduced into the feed section of the extruder along with unpigmented polyethylene resin in such a manner that approximately 23 g of additive were combined with 450 g of resin. The frothed resin which exited the unit was found to contain large amounts of resin pigmented with carbon black, demonstrating that an effective purge had been achieved.

While the present invention has been particularly described in terms of specific embodiments thereof, it will be understood in view of instant teaching that numerous variations upon the invention are now enabled to those skilled in the art which variations yet reside in the scope of the present invention. Accordingly, the invention is to be broadly construed and limited only by the scope and spirit of the claims now appended hereto.

What is claimed is:

1. A method for purging the contents from a thermoplastic extruding apparatus of the type including a heated extruding barrel and a rotatable helical screw mounted in the barrel for axially advancing feed material which is to be extruded; said method comprising:

passing through the said barrel a thermoplastic follower composition which includes a thermoplastic resin in combination with a particulate purging additive which releases gasses or vapors when subjected to the temperatures within said barrel; said additive comprising a compound in which a hydrated silicate is the majority component, and which silicate expands or intumesces upon heating; said additive acting to froth and increase the effective volume of the said follower composition; the resultant frothed follower composition during its passage through the apparatus causing removal of the said apparatus contents of said thermoplastic extruding apparatus.

2. A method in accordance with claim 1, in which said apparatus contents comprises a first thermoplastic composition which includes at least a first thermoplastic resin.

3. A method in accordance with claim 2, in which said first thermoplastic composition further includes undesired degraded materials.

4. A method in accordance with claim 2, in which the resin in said thermoplastic follower composition corresponds to said first resin of said first thermoplastic composition.

5. A method in accordance with claim 3, in which the resin in said thermoplastic follower composition corresponds to said first resin of said first thermoplastic composition.

6. A method in accordance with claim 1, in which said thermoplastic follower composition further includes a colorant.

7. A method in accordance with claim 2, in which said first thermoplastic composition further includes a first colorant, and in which said thermoplastic follower composition further includes a colorant differing from said first colorant.

8. A method in accordance with claim 2, in which the resin in said thermoplastic follower composition differs from the first resin of said first thermoplastic composition.

9. A method in accordance with claim 1, wherein the minimum amount of said purging additive combined with said thermoplastic resin is that necessary to produce a visible frothing of the extrudate as it exits the said barrel of said apparatus.

10. A method in accordance with claim 2, wherein the minimum amount of said purging additive combined with said thermoplastic resin is that necessary to produce a visible frothing of the extrudate as it exits the said barrel of said apparatus.

11. A method in accordance with claim 2, in which said purging additive comprises a free-flowing alkali metal silicate-based particulate material in which said silicate is the majority non-aqueous component and is present as an amorphous phase; the particles of said particulate having a moisture content of about 5 to 40%, and being expandable to at least about 5 times their volume upon heating at a temperature in the range of about 250° F. to about 1100° F.

12. A method in accordance with claim 11, wherein the minimum amount of said purging additive combined with said thermoplastic resin is that necessary to produce a visible frothing of the extrudate as it exits the said barrel of said apparatus.

13. A method in accordance with claim 12, wherein at least 0.1 parts of said additive are combined with 100 parts of said thermoplastic resin by weight.

14. A method in accordance with claim 12, wherein at least 0.3 parts of said additive are combined with 100 parts of said thermoplastic resin by weight.

* * * * *